(12) United States Patent
Williams et al.

(10) Patent No.: US 11,126,394 B2
(45) Date of Patent: Sep. 21, 2021

(54) SYSTEMS AND METHODS FOR CONTENT DELIVERY AND MANAGEMENT

(71) Applicant: LISNR, INC., Cincinnati, OH (US)

(72) Inventors: Rodney B. Williams, Cincinnati, OH (US); Christoper M. Ostoich, Cincinnati, OH (US); Christopher D. Ridenour, Cincinnati, OH (US)

(73) Assignee: LISNR, Inc., Cincinnati, OH (US)

( * ) Notice: Subject to any disclaimer, the term of this patent is extended or adjusted under 35 U.S.C. 154(b) by 1079 days.

(21) Appl. No.: 14/398,675

(22) PCT Filed: May 1, 2013

(86) PCT No.: PCT/US2013/039079
§ 371 (c)(1),
(2) Date: Nov. 3, 2014

(87) PCT Pub. No.: WO2013/166158
PCT Pub. Date: Nov. 7, 2013

(65) Prior Publication Data
US 2015/0113094 A1 Apr. 23, 2015

Related U.S. Application Data

(60) Provisional application No. 61/781,107, filed on Mar. 14, 2013, provisional application No. 61/640,900, filed on May 1, 2012.

(51) Int. Cl.
*G06F 3/16* (2006.01)
*H04M 1/215* (2006.01)
(Continued)

(52) U.S. Cl.
CPC ............ *G06F 3/165* (2013.01); *H04B 11/00* (2013.01); *H04L 67/02* (2013.01); *H04L 67/141* (2013.01);
(Continued)

(58) Field of Classification Search
CPC ......... H04N 21/8106; H04N 21/41407; H04N 21/42203; H04N 21/6581; H04N 21/8358;
(Continued)

(56) References Cited

U.S. PATENT DOCUMENTS

| | | | |
|---|---|---|---|
| 5,159,703 A | 10/1992 | Lowery | |
| 5,335,250 A | 8/1994 | Dent et al. | |

(Continued)

FOREIGN PATENT DOCUMENTS

| | | |
|---|---|---|
| CN | 102625982 A | 8/2012 |
| CN | 103 023 583 B | 4/2015 |

(Continued)

OTHER PUBLICATIONS

Min, G. et al., "Performance Analysis of Different Phase Shift Keying Modulation Schemes in Aeronautical Channels", Jun. 2009.
(Continued)

*Primary Examiner* — Michael Won
(74) *Attorney, Agent, or Firm* — Wood Herron & Evans LLP

(57) ABSTRACT

A content management method uses a portable multifunction device 202 to detect human-inaudible acoustic signals 210, when that signal is heard from the surrounding environment by a device microphone 113 or is output by the device's audio circuitry 100. The device 202 extracts a code from the inaudible signal and supplies the code via wired or wireless communication 232, along with additional optional data regarding the device and/or its user, to a content management system 200. Upon receipt of the code, indicating the received inaudible signal 210 from the portable multifunction device 202, the content management system 200 may provide particular content or a pointer to that content to the portable multifunction device 202, the content being (Continued)

selected based on the particular inaudible signal received. Additional threshold triggers 502 may be delivered to require additional actions to unlock the content.

19 Claims, 9 Drawing Sheets

(51) Int. Cl.

| | | |
|---|---|---|
| *H04M 1/50* | (2006.01) | |
| *H04N 21/414* | (2011.01) | |
| *H04N 21/422* | (2011.01) | |
| *H04N 21/658* | (2011.01) | |
| *H04N 21/81* | (2011.01) | |
| *H04N 21/8358* | (2011.01) | |
| *H04B 11/00* | (2006.01) | |
| *H04L 29/08* | (2006.01) | |
| *H04M 1/72457* | (2021.01) | |

(52) U.S. Cl.
CPC .............. *H04L 67/18* (2013.01); *H04L 67/22* (2013.01); *H04M 1/2155* (2013.01); *H04M 1/505* (2013.01); *H04N 21/41407* (2013.01); *H04N 21/42203* (2013.01); *H04N 21/6581* (2013.01); *H04N 21/8106* (2013.01); *H04N 21/8358* (2013.01); *H04M 1/72457* (2021.01); *H04M 2250/12* (2013.01)

(58) Field of Classification Search
CPC .............. H04M 1/505; H04M 1/2155; H04M 1/72572; H04M 2250/12; G08C 23/02; G06F 3/165; H04L 67/22; H04L 67/141; H04L 67/18; H04L 67/02; H04B 11/00
USPC .......................................................... 709/217
See application file for complete search history.

(56) References Cited

U.S. PATENT DOCUMENTS

| | | | |
|---|---|---|---|
| 5,485,839 A * | 1/1996 | Aida .................. | A61B 17/2256 600/411 |
| 5,565,921 A | 10/1996 | Sasaki et al. | |
| 5,764,763 A | 6/1998 | Jensen et al. | |
| 5,889,870 A | 3/1999 | Norris | |
| 5,923,252 A * | 7/1999 | Sizer ...................... | G09F 27/00 340/567 |
| 5,995,512 A | 11/1999 | Pogue, Jr. | |
| 6,301,368 B1 | 10/2001 | Bolle et al. | |
| 6,511,426 B1 | 1/2003 | Hossack et al. | |
| 6,570,500 B1 * | 5/2003 | Pieper ................. | G08B 13/1681 340/541 |
| 6,664,913 B1 | 12/2003 | Craven et al. | |
| 6,891,482 B2 | 5/2005 | Craven et al. | |
| 6,912,319 B1 | 6/2005 | Barnes et al. | |
| 6,947,893 B1 | 9/2005 | Iwaki et al. | |
| 7,334,735 B1 | 2/2008 | Antebi et al. | |
| 7,383,297 B1 | 6/2008 | Atsmon et al. | |
| 7,904,946 B1 | 3/2011 | Chu et al. | |
| 7,995,197 B2 | 8/2011 | Sikora et al. | |
| 8,140,331 B2 | 3/2012 | Lou | |
| 8,401,569 B1 * | 3/2013 | Bell ...................... | H04M 1/505 367/135 |
| 8,532,644 B2 * | 9/2013 | Bell ...................... | H04M 1/505 455/420 |
| 8,544,753 B2 | 10/2013 | Antebi et al. | |
| 8,711,656 B1 | 4/2014 | Paulson | |
| 8,976,959 B2 | 3/2015 | Duplan et al. | |
| 8,983,089 B1 * | 3/2015 | Chu ....................... | H04R 3/005 381/58 |
| 8,989,779 B1 * | 3/2015 | Centore, III ............ | H04W 4/22 455/456.1 |
| 9,024,998 B2 * | 5/2015 | Chu ........................... | 348/14.02 |
| 9,111,326 B1 * | 8/2015 | Worley, III ........... | G06T 19/006 |
| 9,213,969 B2 | 12/2015 | Arentz | |
| 9,318,166 B2 | 4/2016 | Sharon et al. | |
| 9,361,444 B2 | 6/2016 | Antebi et al. | |
| 9,513,861 B2 | 12/2016 | Lin et al. | |
| 9,766,702 B2 | 9/2017 | Cieplinski et al. | |
| 9,912,415 B2 | 3/2018 | Tsfaty et al. | |
| 10,044,448 B2 | 8/2018 | Mufti | |
| 10,826,623 B2 | 11/2020 | Prince et al. | |
| 2001/0049788 A1 | 12/2001 | Shur | |
| 2002/0008615 A1 | 1/2002 | Heide et al. | |
| 2002/0152045 A1 | 10/2002 | Dowling et al. | |
| 2003/0065727 A1 * | 4/2003 | Clarke .................... | H04L 63/04 709/206 |
| 2003/0206602 A1 | 11/2003 | Yamamoto | |
| 2003/0217269 A1 | 11/2003 | Gantman et al. | |
| 2004/0018018 A1 | 1/2004 | Izadpanah | |
| 2004/0111360 A1 * | 6/2004 | Albanese ............... | G06Q 30/02 705/38 |
| 2005/0008325 A1 * | 1/2005 | Ollis ...................... | H04H 60/16 386/296 |
| 2005/0171649 A1 | 8/2005 | Adachi | |
| 2005/0177361 A1 | 8/2005 | Srinivasan | |
| 2005/0190768 A1 * | 9/2005 | Cutler ................... | H04M 3/567 370/395.2 |
| 2006/0041759 A1 | 2/2006 | Kaliski et al. | |
| 2006/0123239 A1 | 6/2006 | Martinian et al. | |
| 2006/0136544 A1 * | 6/2006 | Atsmon ................... | A63H 3/28 709/200 |
| 2006/0138231 A1 | 6/2006 | Elberbaum | |
| 2007/0153091 A1 | 7/2007 | Watlington et al. | |
| 2007/0220544 A1 * | 9/2007 | Nash-Putnam ........ | H04H 20/14 725/32 |
| 2007/0272750 A1 | 11/2007 | Bjorklund | |
| 2008/0071537 A1 | 3/2008 | Tamir et al. | |
| 2008/0134264 A1 * | 6/2008 | Narendra ............... | H04H 60/43 725/110 |
| 2008/0157938 A1 | 7/2008 | Sutardja | |
| 2008/0165022 A1 | 7/2008 | Herz et al. | |
| 2008/0173717 A1 | 7/2008 | Antebi et al. | |
| 2008/0227436 A1 | 9/2008 | Gantman et al. | |
| 2008/0228498 A1 | 9/2008 | Gasque | |
| 2009/0019061 A1 | 1/2009 | Scannell, Jr. | |
| 2009/0088133 A1 | 4/2009 | Orlassino | |
| 2009/0210789 A1 * | 8/2009 | Thakkar ................ | H04L 65/605 715/719 |
| 2010/0034474 A1 | 2/2010 | Crucs | |
| 2010/0053169 A1 * | 3/2010 | Cook ........................ | G06F 3/16 345/440.1 |
| 2010/0149022 A1 | 6/2010 | Fam et al. | |
| 2010/0165879 A1 | 7/2010 | Gupta et al. | |
| 2010/0280641 A1 | 11/2010 | Harkness et al. | |
| 2010/0305449 A1 | 12/2010 | Wegener et al. | |
| 2010/0331689 A1 | 12/2010 | Wegener | |
| 2011/0029359 A1 | 2/2011 | Roeding et al. | |
| 2011/0099295 A1 | 4/2011 | Wegener | |
| 2011/0124399 A1 * | 5/2011 | Dutilly .................... | A63F 13/69 463/25 |
| 2011/0143677 A1 | 6/2011 | Jung et al. | |
| 2011/0164595 A1 | 7/2011 | So et al. | |
| 2011/0179182 A1 * | 7/2011 | Vadla Ravnas ........ | G06Q 10/10 709/227 |
| 2011/0295691 A1 * | 12/2011 | Krieter ..................... | G09F 1/04 705/14.58 |
| 2011/0301439 A1 | 12/2011 | Albert et al. | |
| 2012/0051187 A1 * | 3/2012 | Paulson ................. | H04B 11/00 367/135 |
| 2012/0064874 A1 * | 3/2012 | Pierce, Jr. ......... | H04M 1/72522 455/418 |
| 2012/0084131 A1 | 4/2012 | Bergel et al. | |
| 2012/0089461 A1 | 4/2012 | Greenspan | |
| 2012/0134238 A1 | 5/2012 | Surprenant et al. | |
| 2012/0179525 A1 | 7/2012 | Seguin et al. | |
| 2012/0197738 A1 | 8/2012 | Wakabayashi | |
| 2012/0209949 A1 * | 8/2012 | Deliyannis .......... | H04L 65/4084 709/217 |
| 2012/0214416 A1 | 8/2012 | Kent et al. | |

(56) References Cited

U.S. PATENT DOCUMENTS

| | | | |
|---|---|---|---|
| 2012/0232906 A1* | 9/2012 | Lindahl | G10L 15/30 704/270.1 |
| 2012/0290648 A1* | 11/2012 | Sharkey | G06F 16/40 709/204 |
| 2012/0295560 A1* | 11/2012 | Mufti | H04N 21/4622 455/95 |
| 2013/0078988 A1* | 3/2013 | Bell | H04M 1/505 455/420 |
| 2013/0079057 A1* | 3/2013 | Bell | H04W 4/12 455/556.1 |
| 2013/0082850 A1 | 4/2013 | Takeshima | |
| 2013/0106977 A1* | 5/2013 | Chu | H04N 7/142 348/14.02 |
| 2013/0176984 A1 | 7/2013 | Koezuka | |
| 2013/0185137 A1* | 7/2013 | Shafi | G06Q 30/0207 705/14.35 |
| 2013/0262539 A1 | 10/2013 | Wegener | |
| 2013/0273968 A1 | 10/2013 | Rhoads et al. | |
| 2013/0279300 A1 | 10/2013 | Iwase et al. | |
| 2014/0039654 A1 | 2/2014 | Akiyama et al. | |
| 2014/0045586 A1* | 2/2014 | Allen | G07F 17/323 463/25 |
| 2014/0050321 A1 | 2/2014 | Albert et al. | |
| 2014/0101738 A1 | 4/2014 | Sama | |
| 2014/0129232 A1 | 5/2014 | Jones et al. | |
| 2014/0140503 A1* | 5/2014 | Duplan | H04K 1/02 380/35 |
| 2014/0172141 A1 | 6/2014 | Mangold | |
| 2014/0210122 A1* | 7/2014 | Chung | B01J 20/28019 264/42 |
| 2014/0327677 A1* | 11/2014 | Walker | G06T 11/206 345/440 |
| 2014/0369527 A1 | 12/2014 | Baldwin | |
| 2015/0113094 A1* | 4/2015 | Williams | H04L 67/22 709/217 |
| 2015/0243163 A1 | 8/2015 | Shoemake | |
| 2015/0297193 A1 | 10/2015 | Rothberg et al. | |
| 2015/0309151 A1 | 10/2015 | Shibata et al. | |
| 2016/0142157 A1 | 5/2016 | Jeong et al. | |
| 2016/0373430 A1 | 12/2016 | Bhat et al. | |
| 2017/0279542 A1 | 9/2017 | Knauer et al. | |
| 2017/0279571 A1 | 9/2017 | Melodia et al. | |
| 2018/0132298 A1 | 5/2018 | Birnam et al. | |
| 2018/0167147 A1 | 6/2018 | Almada et al. | |
| 2018/0329676 A1 | 11/2018 | Williams et al. | |
| 2019/0096412 A1 | 3/2019 | Knauer et al. | |
| 2019/0190621 A1 | 6/2019 | Prince et al. | |
| 2019/0204409 A1 | 7/2019 | Booij et al. | |
| 2019/0253101 A1 | 8/2019 | Kilian et al. | |
| 2019/0268078 A1 | 8/2019 | Okunev et al. | |

FOREIGN PATENT DOCUMENTS

| | | |
|---|---|---|
| EP | 273815 B1 | 1/1993 |
| EP | 1758308 A1 | 2/2007 |
| EP | 2847984 A1 | 3/2015 |
| EP | 3207639 A1 | 8/2017 |
| EP | 3358811 A1 | 8/2018 |
| JP | 06090296 A | 3/1994 |
| JP | 2001-320337 A | 11/2001 |
| JP | 20031744404 A | 6/2003 |
| JP | 2003-324491 A | 11/2003 |
| JP | 2007164659 A | 6/2007 |
| JP | 2008-293393 A | 12/2008 |
| JP | 2011-141784 A | 7/2011 |
| JP | 2012-525655 A | 10/2012 |
| KR | 10-1136279 B1 | 4/2012 |
| RU | 2326495 C2 | 6/2008 |
| WO | 2002/45273 A2 | 6/2002 |
| WO | 2005/122483 A1 | 12/2005 |
| WO | 2013-129587 A1 | 9/2013 |
| WO | 2013-166158 A1 | 11/2013 |
| WO | 2014-069617 A1 | 5/2014 |
| WO | 2014-104284 A1 | 7/2014 |
| WO | 2016/061353 A1 | 4/2016 |
| WO | 2016/123047 A1 | 8/2016 |
| WO | 2019/067861 A1 | 4/2019 |

OTHER PUBLICATIONS

Chitode, J.S. Communication Theory. 2002. Technical Publications. Prune. 5-28. Sec. 5-6 near 5-7 Source Coding Theorem Shannon's First Theorem). (Year: 2002).
Lee et al.; Chirp Signal-Based Aerial Acoustic Communication for Smart Devices; 2015.
Chen, Changsheng; QR Code Authentication with Embedded Message Authentication Code; Mobile Networks and Applications 22.3; 383-394, New York: Springer Nature B.V. (Jun. 2017) Published Online Nov. 17, 2016.
Kuhn, Markus; Digital Signal Processing; University of Cambridge, Computer Laboratory; http://www.cl.cam.ac.uk/teaching/1112/DSP, Michaelmas 2011-Part II.

* cited by examiner

SYSTEMS AND METHODS FOR CONTENT DELIVERY AND MANAGEMENT

CROSS-REFERENCE TO RELATED APPLICATIONS

This Application is a US National Stage of US2013/039079 filed May 13, 2013, which claims priority to the benefit of U.S. Provisional Application 61/781,107 filed Mar. 14, 2013, and U.S. Provisional Application 61/640,900 filed on May 1, 2012, the entirety of which are hereby incorporated by reference in this application as if fully set forth herein.

BACKGROUND OF THE INVENTION

Communication via inaudible sonic signals has been disclosed in the art, for example in U.S. Patent Publications 2007-0220544 and 2013-0079058, and U.S. Pat. Nos. 8,532,644, 8,401,569. However, these filings disclose only the manner of communicating information, providing few useful or practical applications of those communications.

TECHNICAL FIELD

This application generally relates to systems and methods for delivering content from a remote content provider to a mobile device based on one or more inaudible signals received by the device.

SUMMARY OF THE INVENTION

Various non-limiting embodiments of the present disclosure will now be described to provide an overall understanding of the principles of the structure, function, and use of the content delivery and management systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The main disclosed embodiments are generally directed to portable multifunction devices configured to detect inaudible signals. The portable multifunction devices may be configured to then wirelessly supply an indication of the inaudible signal that was received to a content management system. Upon receipt of the indication of the received inaudible signal from the portable multifunction device, the content management system may provide particular content to the portable multifunction device based on the particular inaudible signal received.

In various embodiments, the portable multifunction devices may detect the inaudible signal through a generally passive detection processes. In other words, a user of the portable multifunction device does not necessarily have to routinely initiate or activate the detection process. Instead, the detection process may be a background routine that operates in the random access memory (RAM) of a portable multifunction device, for example. The background routine may periodically, or at least routinely, query signals received or generated by various on-board components of the portable multifunction device in order to detect if an inaudible signal is present. These queries may be performed without additional input from the user. Components queried by the detection process may include, without limitation, on-board microphones, on-board speakers, and other audio output ports (such as a headphone output or a line level output, for example).

The inaudible signal may be received by the portable multifunction devices from any suitable source. For example, the inaudible signal may be embedded in audio content that is received by a microphone of the portable multifunction device. In this regard, the source may be any audio speaker within the proximity of the portable multifunction device. The audio content may also be supplied by an on-board audio generating application, such as music player module, or an on-board video player application, such as video player module, or provided to a line-out port (such as a headphone jack) or an external speaker of the portable multifunction device.

Example systems and methods for embedding inaudible signals into audio content are provided in the following US patent applications, the entirety of these three application is hereby incorporated by reference in their entirety: U.S. patent application Ser. No. 13/286,613 entitled "SYSTEM EFFECTIVE TO MODULATE A CODE AND PROVIDE CONTENT TO A USER" filed Nov. 1, 2011, U.S. patent application Ser. No. 13/286,670 entitled "SYSTEM EFFECTIVE TO DEMODULATE A MODULATED CODE AND PROVIDE CONTENT TO A USER" filed September Nov. 1, 2011, and U.S. patent application Ser. No. 13/286,727 entitled "DEVICE EFFECTIVE TO MODULATE A CODE AND TO PROVIDE CONTENT TO A USER" filed Nov. 1, 2011.

In various embodiments, inaudible signals are signals that are outside the range of human hearing or other signals not otherwise detectable by humans. For example, in some embodiments, the inaudible signal may be generated by frequencies above 20,000 Hz or less than 20 Hz. The inaudible signal may be the form of a modulated code, as described in the above-reference patent applications, which is a series of logic 0s and 1s. The modulated code may be repeatedly and periodically outputted by a sound source. The portable multifunction device may be able to demodulate the modulated code in the inaudible signal to determine the logical series of 0s and 1s associated with the inaudible signal. The logical series of 0s and 1s may be, for example, a coded identifier which can be transmitted to a content management system via various communications protocols. As used herein, the term inaudible signal is used to broadly refer to any type of signal, code, frequency, waveform, or otherwise that may be transmitted by a source and detected by a portable multifunction device. The inaudible signal may be processed by the portable multifunction device by a process or routine passively running on the portable multifunction device. It is noted that while various embodiments utilize an inaudible signal in the form of a modulated code, this disclosure is not so limited.

Upon detecting an inaudible signal, the portable multifunction device may process the inaudible signal to extract a coded identifier. The extraction process may be a generally passive process which may be performed by the processor of the portable multifunction device. In some embodiments, the coded identifier may then be provided to a content management system via a wireless communication network. Supplemental information may also be provided to the content management system along with the coded identifier, such as a time/date data, accelerometer data, geographic data, demographic data, device data, owner data, and so forth. The content management system may process the received information to identify content to transmit to the portable multifunction device. The content may be stored locally to the content management system or may be stored in data stores remote from the content management system. In any event, the content may be in any suitable file format or file type. A non-limiting and non-exhaustive list of example content that may be provided to a portable multifunction device includes video-based content, audio-based content, image-based content, and text-based content. Video-based content may include, without limitation, concert footage, music videos, artist interviews, movies, commercials and so forth. Audio-based content may include, without limitation, songs, ringtones, and so forth. Image-based content may include, without limitation, pictures, logos, wallpapers, and so forth. Text-based content may include, without limitation, lyrics, quotes, coupons, passwords, passcodes, email messages, text messages, instant messages, and so forth. In some embodiments, the content may be advertisements or educational in nature. This disclosure is not limited to any particular content which may be delivered to portable multifunction devices associated with the content management system.

In various embodiments, the particular content delivered to a portable multifunction device may be based on the coded identifier and one or more triggers. Over time additional content may be accessible (unlocked) as the portable multifunction device, or user of the portable multifunction device, satisfies various thresholds. For example, the number of times a particular inaudible signal has been received by the portable multifunction device may determine which content is sent to the portable multifunction device. If the inaudible signal is embedded in a song, the number of times the inaudible signal is received may indicate the number of times the song has been listened to by a user associated with the portable multifunction device. As the user listens to the song more and more, additional content ("unlocked content") may be delivered to that user's portable multifunction device. As is to be appreciated, that additional content may be labeled or otherwise considered as "exclusive" content that is only available to certain types or groups of listeners. For example, an inaudible signal may be broadcast at a music venue while an artist is performing a concert. Audience members having portable multifunction devices passively detecting for inaudible signals will receive and process the inaudible signal. The portable multifunction device may then extract the coded identifier and provide the information to a content management system via a wireless communications network. The content management system may match the coded identifier to stored content associated with the performing artist. The content may then be pushed to the portable multifunction device that originally sent the coded identifier. The user will then be able to access the content via their portable multifunction device. Thus, in the illustrated embodiment, the portable multifunction device passively detected the inaudible signal, extracted the coded identifier, transmitted the coded identifier and received affiliated content without any input or interaction from a user.

In some embodiments, the particular content delivered to a portable multifunction device may be function of where the device is geographically located. In other words, portable multifunction devices in a first city that passively detect a certain inaudible signal may receive a first piece of content while portable multifunction devices in a second city that detect the same inaudible signal may receive a second piece of content. Additionally, the content delivered to the portable multifunction device may depend on other triggers, such as whether the portable multifunction device is moving (in a car), the time of day, user preferences, and so forth.

The content received by the portable multifunction device may be stored, arranged, and viewed in any suitable configuration. The content may be viewed at the time of receipt or at a later point in time. In one embodiment, content is delivered to an electronic mailbox associated with the user. In one embodiment, content is delivered to an application or module that is executable by the portable multifunction device. A user can execute the application and access the content. As is to be appreciated, the content can be sorted in any suitable hierarchy or schema. In some embodiments, "locked" content may be displayed to the user through the application. In order to unlock the content, the user must, for example, satisfy certain parameters or thresholds. The thresholds may relate to a total number of listens, a geographic location, and so forth. In any event, when content is received by the portable multifunction device, a notification may be provided to the user by the portable multifunction device. In one embodiment, upon receiving the notification, the user can then navigate the associated application to view the content received.

Merely for the purposes of illustration explanation, many of the following embodiments are described in the context of inaudible signals embedded in audio songs. The disclosure is not so limited. In fact, the systems and methods described herein may be used across a wide variety of platforms and implementations. For example, the passive detection routines described herein can be used to detect inaudible signals associated with television shows, commercials, movies, and the like. In some embodiments, the passive detection routines described herein can be used to detect stand-alone inaudible signals that are not embedded in audio signals. Such stand-alone inaudible signals may be transmitted in, for example, commerce/shopping environments, business environments, music venues, entertainment venues, or any other suitable environments or venues. Portable multifunction devices may also be configured to transmit inaudible signals using its on-board speaker, for example. The inaudible signal may be received and processed by other portable multifunction devices positioned proximate the transmitting portable multifunction device. In any event, upon passively detecting the inaudible signal and providing an indication of the inaudible signal to a content management system, particular content can be delivered to the portable multifunction device in accordance with the systems and methods described herein.

In alternate embodiments, inaudible signals may be used in peer-to-peer communication between portable multifunction devices. For example, one portable multifunction device may produce an inaudible signal via its speaker, which is heard by a second portable multifunction device. The code included in the inaudible signal may embed an IP address and port number for the sending multifunction device, permitting the recipient multifunction device to initiate a peer-to-peer networking connection with the sending device using their common network connection. If the devices are on a common local area network, e.g., a wifi network, the addresses used for peer-to-peer networking may be private IP addresses within that LAN; if, alternatively, the devices are on a wide area network, e.g. cellular internet, the addresses used for peer-to-peer networking may be public IP addresses.

Peer-to-peer connections between a sender and listener device permit a number of applications, including:

Ad-hoc networking between a portable multifunction device and door lock to permit the multifunction device to provide an unlock key to the door, e.g., a hotel room or private residence, in a contactless manner. Either the door or multifunction device may be the sender of the inaudible signal.

Ad-hoc networking between a portable multifunction device and a point of sale/cash register to permit the multifunction device to provide payment information or coupon information in a contactless manner via internet or LAN communications: for this application the sender of the inaudible signal may be the point of sale/cash register if that device has a speaker but lacks a microphone.

Ad-hoc networking between a portable multifunction device and a vehicle, using the vehicles speakers or microphone to send or receive the inaudible signal and set up a BLUETOOTH (IEEE 802.15.1 and successors) connection, Internet connection, OBD2 connection or any other operative connection between the portable multifunction device and vehicle electronics.

Ad-hoc networking between portable multifunction devices for contact information exchange, data transfer or data pointer transfers, or currency or value exchange.

Ad-hoc networking between a server at a given location and plural portable multifunction devices to form a mesh network of those devices for display of information, such as a concert light show, or to gather audio or video of an event from multiple perspectives via each portable multifunction device to enable recording or broadcast of that event.

BRIEF DESCRIPTION OF THE DRAWINGS

The present disclosure will be more readily understood from a detailed description of some example embodiments taken in conjunction with the following figures.

DETAILED DESCRIPTION

Figure 1:
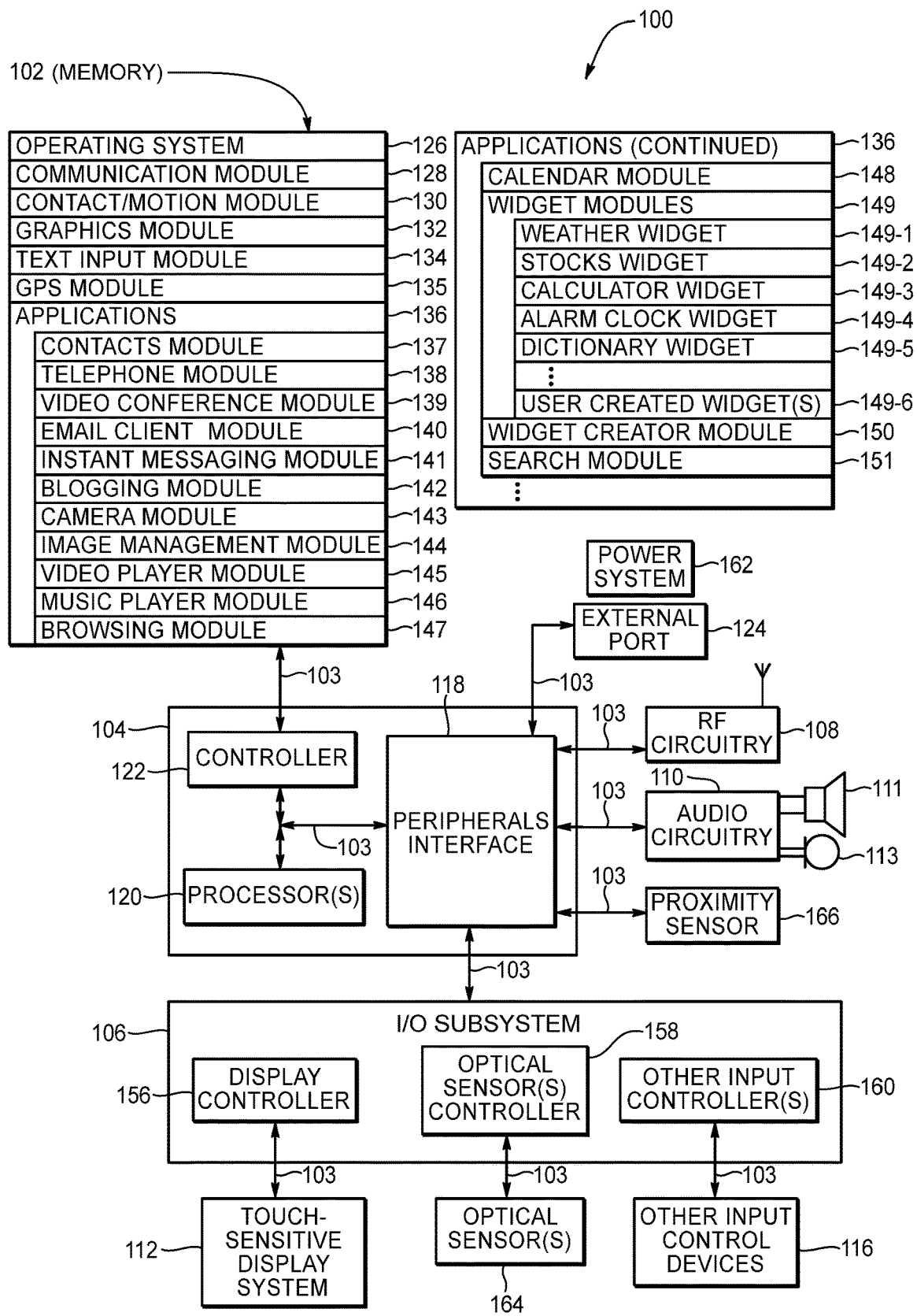
FIG. 1 is a block diagram illustrating a portable multifunction device in accordance with one non-limiting embodiment.

Attention is now directed towards embodiments of the device. FIG. 1 is a block diagram illustrating a portable multifunction device 100 which may be utilized to detect inaudible signals and receive affiliated content in accordance with the systems and methods described herein. In some embodiments, the portable multifunction device 100 may passively detected for inaudible signals. In some embodiments, a user of the portable multifunction device 100 may be able to selectively activate the detection routine.

The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), Long Term Evolution (LTE), time division multiple access (TDMA), BLUETOOTH (IEEE 802.15.1 and successors), Wireless Fidelity (Wi-Fi) (such as, for example, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output and input.

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons, dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (208, FIG. 2, for example) may include an up/down button for volume control of the speaker 111 and/or the microphone 113. The one or more buttons may include a push button (206, FIG. 2, for example). The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a click wheel as an input control device 116. A user may navigate among and interact with one or more graphical objects (henceforth referred to as icons) displayed in the touch screen 112 by rotating the click wheel or by moving a point of contact with the click wheel (such as where the amount of movement of the point of contact is measured by its angular displacement with respect to a center point of the click wheel.) The click wheel may also be used to select one or more of the displayed icons. For example, the user may press down on at least a portion of the click wheel or an associated physical button. User commands and navigation commands provided by the user via the click wheel may be processed by an input controller 160 as well as one or more of the modules and/or sets of instructions in memory 102.

The device 100 also includes a power system 162 for powering the various components. The power system 162 may include a power management system, one or more power sources, a recharging system, a power failure detection circuit, a power converter or inverter, a power status indicator (such as a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 144, the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (such as by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. In some embodiments, the proximity sensor turns off and disables the touch screen 112 when the multifunction device is placed near the user's ear. In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (such as a PALM OS, MICROSOFT OS, APPLE OS, UNIX OS, LINUX OS, SYMBIAN OS, EMBEDIX OS, Binary Run-time Environment for Wireless (BREW) OS, JavaOS, a Wireless Application Protocol (WAP) OS, and others) includes various software components and/or drivers for controlling and managing general system tasks (such as memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (such as a Universal Serial Bus (USB), FIREWIRE, etc.) is adapted for coupling directly to other devices or indirectly over a network (such as the Internet, wireless LAN, etc.). In some embodiments, the external port is a multi-pin connector that is the same as, or similar to and/or compatible with the 30-pin connector used on IPOD (trademark of Apple Computer, Inc.) devices.

The contact/motion module 130 may detect contact with the touch screen 112 (in conjunction with the display controller 156) and other touch sensitive devices (such as a touchpad or click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (such as one finger contacts) or to multiple simultaneous contacts (such as "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, typically between 0.2 and 1.0 seconds, and generally less than two seconds.

The text input module 134, which may be a component of graphics module 132, provides soft keyboards for entering text in various applications, such as contacts 137, e-mail 140, IM 141, blogging 142, browser 147, and any other application that needs text input.

The GPS module 135 determines the location of the device and provides this information for use in various applications, such as to telephone 138 for use in location-based dialing, to camera 143 and/or blogger 142 as picture/video metadata, and to applications that provide location-based services such as weather widgets, local yellow page widgets, and map/navigation widgets.

The applications 136 may include the following modules (or sets of instructions), or a subset or superset thereof: a contacts module 137 (sometimes called an address book or contact list); a telephone module 138; a video conferencing module 139; an e-mail client module 140; an instant messaging (IM) module 141; a blogging module 142; a camera module 143 for still and/or video images; an image management module 144; a video player module 145; a music player module 146; a browser module 147; a calendar module 148; widget modules 149, which may include weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6; and/or search module 151.

Examples of other applications 136 that may be stored in memory 102 include memo pad and other word processing applications, JAVA-enabled applications, encryption, digital rights management, voice recognition, and voice replication. As described in more detail below, one or more applications for passively detecting inaudible signals may also be stored in the memory 102. An application for accessing content received from the content management system may also be stored in memory 102. In some embodiments, this application may be the same application that passively detects the inaudible signals.

In conjunction with touch screen 112, display controller 156, contact module 130, graphics module 132, audio circuitry 110, and speaker 111, the video player module 145 may be used to display, present or otherwise play back videos (such as on the touch screen or on an external, connected display via external port 124, for example). The videos may be received from the content management systems described herein.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an IPOD (trademark of Apple Computer, Inc.). The recorded music and other sound files may be received from the content management system described herein.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

Figure 2:
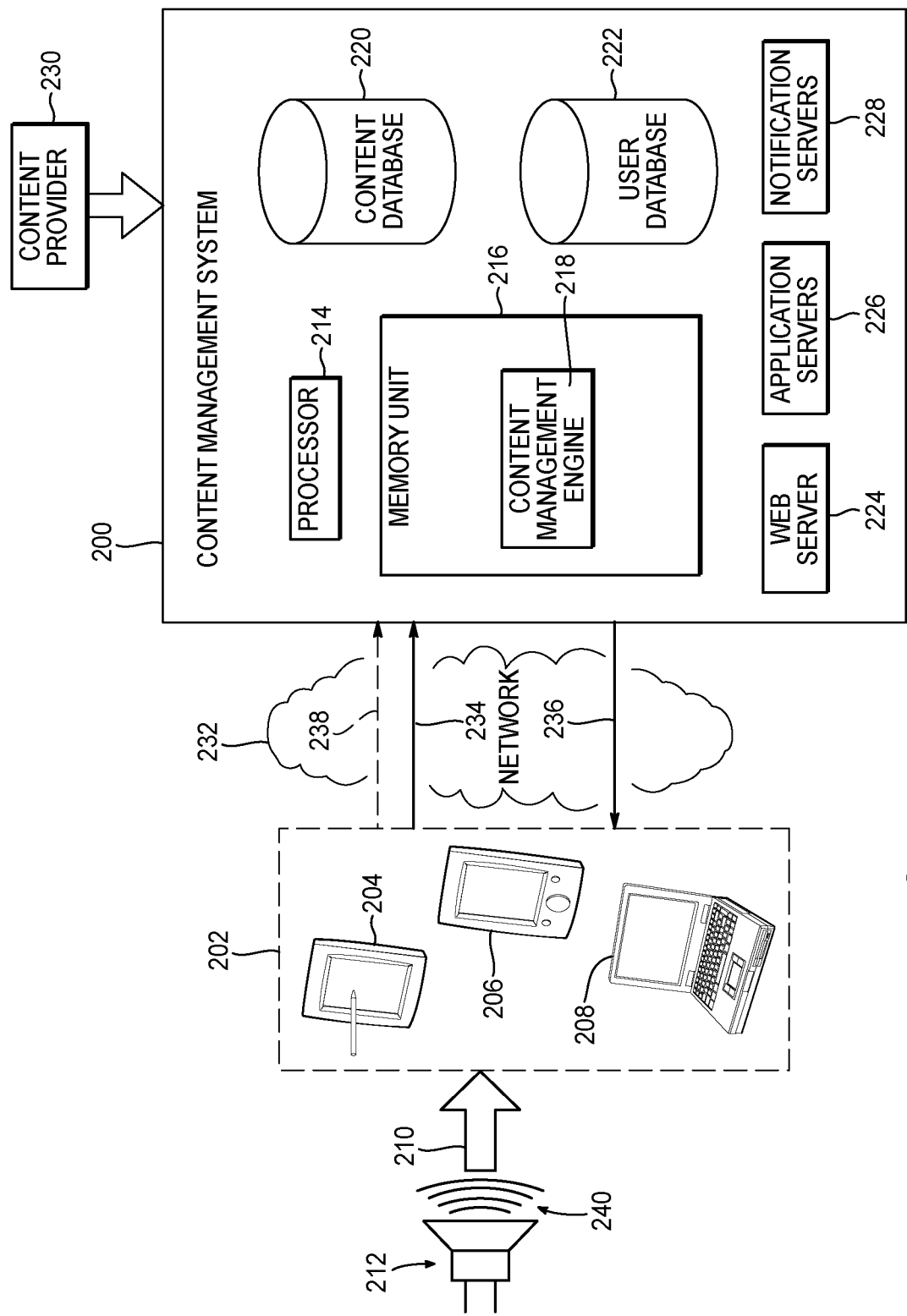
FIGS. 2-4 show portable multifunction devices in communication with content management systems in accordance with various non-limiting embodiments.

Referring now to FIG. 2, one example embodiment of the present disclosure may comprise a content management system 200 that receives and processes information affiliated with inaudible signals. The content management system 200 may then determine which content to provide to users and then wirelessly provide the content to portable multifunction devices associated with the users. The content management system 200 may be provided using any suitable processor-based device or system, such as a personal computer, laptop, server, mainframe, or a collection (e.g., network) of multiple computers, for example. The content management system 200 may include one or more processors 214 and one or more computer memory units 216. For convenience, only one processor 214 and only one memory unit 216 are shown in FIG. 2. The processor 214 may execute software instructions stored on the memory unit 216. The processor 214 may be implemented as an integrated circuit (IC) having one or multiple cores. The memory unit 216 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The memory unit 216 may store executable software and data for content management engine 218. When the processor 214 of the content management system 200 executes the software of the content management engine 218, the processor 214 may be caused to perform the various operations of the content management system 200. Operations may include, without limitation, receive an indication of an inaudible signal from a portable communication device 202 (such as in the form of a coded identifier 234, for example), identify content associated with the coded identifier, receive and analyze supplemental information received from the portable communication device 202, and send content 236 to the portable communication device 202 via a wireless communication network. Data used by the content management engine 218 may be from various sources, such as a content database 220, which may be an electronic computer database, for example. The data stored in the content database 220 may be stored in a non-volatile computer memory, such as a hard disk drive, a read only memory (e.g., a ROM IC), or other types of non-volatile memory. Also, the data of the content database 220 may be stored on a remote electronic computer system, for example. The data in the content database 220 may be, without limitation, video content, audio content, text-based content, and so forth. The pieces of content in the content database 220 may be tied to a particular coded identifier, for example. In some embodiments, a content provider 230 may use a web portal, application program interface (API), or other form of interface to provide and manage content of the content management system 200. For example, a content provider 230 may provide instructions to the content management system 200 to send content "A", "B", and "C" to portable multifunction devices 202 that supply a coded identifier "X".

User database 222, which may be an electronic computer database, for example, may also provide used by the content management engine 218. The data stored in the user database 222 may be stored in a non-volatile computer memory, such as a hard disk drive, a read only memory (e.g., a ROM IC), or other types of non-volatile memory. Also, the data of the user database 222 may be stored on a remote electronic computer system, for example. Data stored in the user database 222 may related to information regarding particular users of the content management system 200, such as triggers, user preferences, and so forth.

The content management system 200 may be in communication with portable multifunction devices 202 via an electronic communications network 232. The communications network may include a number of computer and/or data networks, including the Internet, LANs, WANs, GPRS networks, etc., and may comprise wired and/or wireless communication links. The portable multifunction devices 202 that communicate with the content management system 200 may be any type of client device suitable for communication over the network, such as a personal computer, a laptop computer, or a netbook computer, for example. In some example embodiments, a user may communicate with the network via a portable multifunction device 202 that is a combination handheld computer and mobile telephone, sometimes referred to as a smart phone. It can be appreciated that while certain embodiments may be described with users communication via a smart phone or laptop by way of example, the communication may be implemented using other types of user equipment (UE) or wireless computing devices such as a mobile telephone, personal digital assistant (PDA), combination mobile telephone/PDA, handheld device, mobile unit, game device, messaging device, media player, or other suitable mobile communications devices.

In some embodiments, the portable multifunction device 202 may be similar to portable multifunction device 100 (FIG. 1). By way of illustration, FIG. 2 shows example portable multifunction devices 202, including a tablet computer 204, a smart phone 206, and a laptop 208. Other types of portable multifunction devices may be used.

Some of the portable multifunction devices 202 also may support wireless wide area network (WWAN) data communications services including Internet access. Examples of WWAN data communications services may include Evolution-Data Optimized or Evolution-Data only (EV-DO), Long Term Evolution (LTE), Evolution For Data and Voice (EV-DV), CDMA/1×RTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. The user device 102 may provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others.

In some example embodiments, the portable multifunction devices 202 also may be arranged to perform data communications functionality in accordance with shorter range wireless networks, such as a wireless personal area network (PAN) offering Bluetooth® data communications services in accordance with the Bluetooth®. Special Interest Group (SIG) series of protocols, specifications, profiles, and so forth. Other examples of shorter range wireless networks may employ infrared (IR) techniques or near-field communication techniques and protocols, such as electromagnetic induction (EMI) techniques including passive or active radio-frequency identification (RFID) protocols and devices.

Similar to the portable multifunction device 100 illustrated in FIG. 1, the portable multifunction device 202 may provide a variety of applications for allowing a user to accomplish one or more specific tasks using the content management system 200. The portable multifunction device 202 may comprise various software programs such as system programs and applications to provide computing capabilities in accordance with the described embodiments. System programs may include, without limitation, an operating system (OS), device drivers, programming tools, utility programs, software libraries, application programming interfaces (APIs), and so forth.

In general, a software application may provide an interface to communicate information between the content management system 200 and the user via portable multifunction devices 202. The software application may include or be implemented as executable computer program instructions stored on computer-readable storage media such as volatile or non-volatile memory capable of being retrieved and executed by a processor to provide operations for the portable multifunction device 202. The memory may also store various databases and/or other types of data structures (e.g., arrays, files, tables, records) for storing data for use by the processor and/or other elements of the user devices 202.

Referring still to FIG. 2, the content management system 200 may include several computer servers. For example, the content management system 200 may include one or more web servers 224, application servers 226, and notification servers 228. For convenience, only one web server 224, application server 226, and one notification server 228 are shown in FIG. 2, although it should be recognized that this disclosure is not so limited. The web server 224 may provide a graphical web user interface through which users of the system (such as content owners or managers) may interact with the content management system 200. The web server 224 may accept requests, such as HTTP requests, from clients (such as web browsers) such as HTTP responses, along with optional data content, such as web pages (e.g., HTML documents) and linked objects (such as images, etc.).

The application server 226 may provide a user interface for users communicating with the content management system 200. Such users may have software installed on their portable multifunction device 202 that allows them to communicate with the application server 226 via the network 232. Such software may be downloaded, for example, from the content management system 200, or other software application provider, over the network to such user portable multifunction device 202. The software may also be installed on such portable multifunction device 202 by other means known in the art.

The notification server 228 may cause notifications, such as emails, text messages, smart phone notifications, phone calls, or other types of communications, to be sent to the portable multifunction device 202 via the network 232 and to track/store the notifications.

The servers 224, 226, 228 may comprise processors (such as CPUs, for example), memory units (such as RAM, ROM, for example), non-volatile storage systems (such as hard disk drive systems, for example). The servers 224, 226, 228 may utilize operating systems, such as Solaris, Linux, or Windows Server SOLARIS (trademark of Oracle Corporation), LINUX (trademark of The Linux Foundation) or WINDOWS SERVER (trademark of Microsoft, Inc.) operating systems, for example.

Although FIG. 2 depicts a limited number of elements for purposes of illustration, it can be appreciated that the content management system 200 may include more or less elements as well as other types of elements in accordance with the described embodiments. Elements of the content management system 200 may include physical or logical entities for communicating information implemented as hardware components (computing devices, processors, logic devices, and so forth), executable computer program instructions (firmware, software) to be executed by various hardware components, or combination thereof, as desired for a given set of design parameters or performance constraints.

In one embodiment, the portable multifunction device 202 passively detects an inaudible signal 210 that is emitted from a source 212. As described above, the inaudible signal 210 may be embedded in audio content 240, for example. The inaudible signal 210 may be analyzed by the portable multifunction device 202 to extract a coded identifier 234. The coded identifier 234 may then be transmitted, uploaded, or otherwise provided to the content management system 200 by the portable multifunction device 202. Additional information 238 may also be transmitted from the portable multifunction device 202 to the content management system 200. Additional information 238 may include, for example, user information, locational information, device information, and so forth. While the illustrated embodiment is described in terms of a coded identifier 234, this disclosure is not so limited. An indication of the inaudible signal received can be transmitted to the content management system 200 in any suitable format. Upon receipt of the coded identifier 234, the content management system 200 may match that particular coded identifier to a particular content 236. The content management system 200 may also determine if certain thresholds and/or triggers have been satisfied. The content management system 200 may then transmit the particular content 236 to the portable multifunction device.

Figure 3:
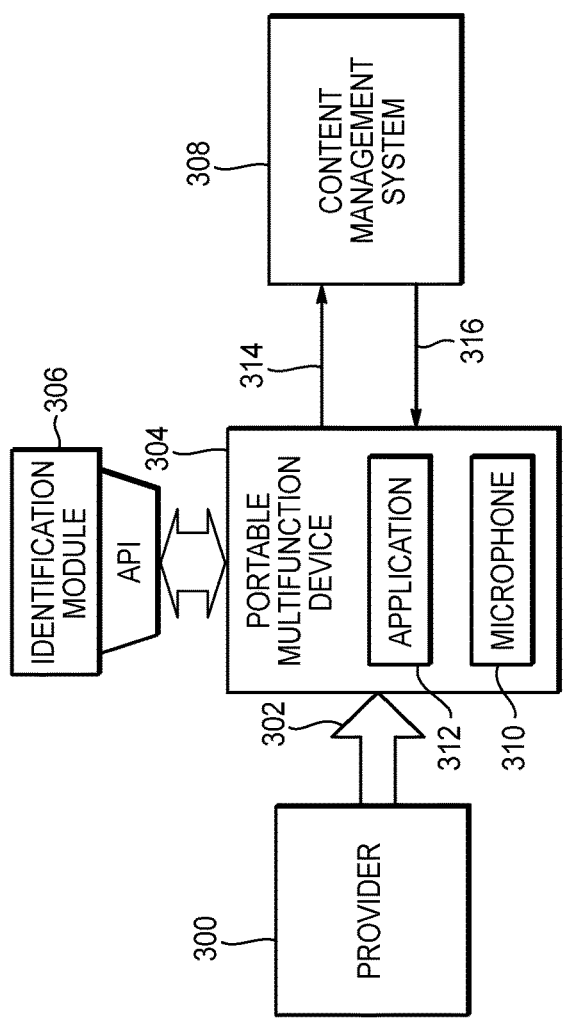

FIG. 3 illustrates an example computer-based content delivery system in accordance with one non-limiting embodiment. A provider 300 may transmit an inaudible signal 302. The provider 300 may be, for example, an audio speaker, a beacon, a line-out of a portable multifunction device (such as portable multifunction device 304), or any other suitable transmission device. An application 312 running on the portable multifunction device 304 may routinely detect for inaudible signals, such as by polling signals received via the microphone 310. Upon detection of the inaudible signal 302 the application 312 may process the signal to extract information contained within the inaudible signal 302 (such as a coded identifier, for example). The coded identifier may be provided to an identification module 306 via an application program interface (API). In one example embodiment, identification module may be operated by SONIC NOTIFY (www.sonicnotify.com), although this disclosure is not so limited. The identification module 306 may analyze the coded identifier to determine, for example, an entity associated with embedding that particular coded identifier in the audio content (such as entity information). The identification module 306 may return supplemental information to the portable multifunction device 304. Upon receiving the supplemental information from the identification module 306, the application 312 may determine whether to contact a content management system 308, or perhaps determine which content management system to contact based on the entity information, for example. In any event, the portable multifunction device 304 may then transmit an upload packet 314 to the content management system 308. The upload packet 314 may include, for example, a coded identifier and other information that could be used to determine if various triggers are satisfied. The content management system 308 may then match the coded identifier to a piece of stored content. The stored content may then be transmitted to the portable multifunction device 304 via download packet 316.

Figure 4:
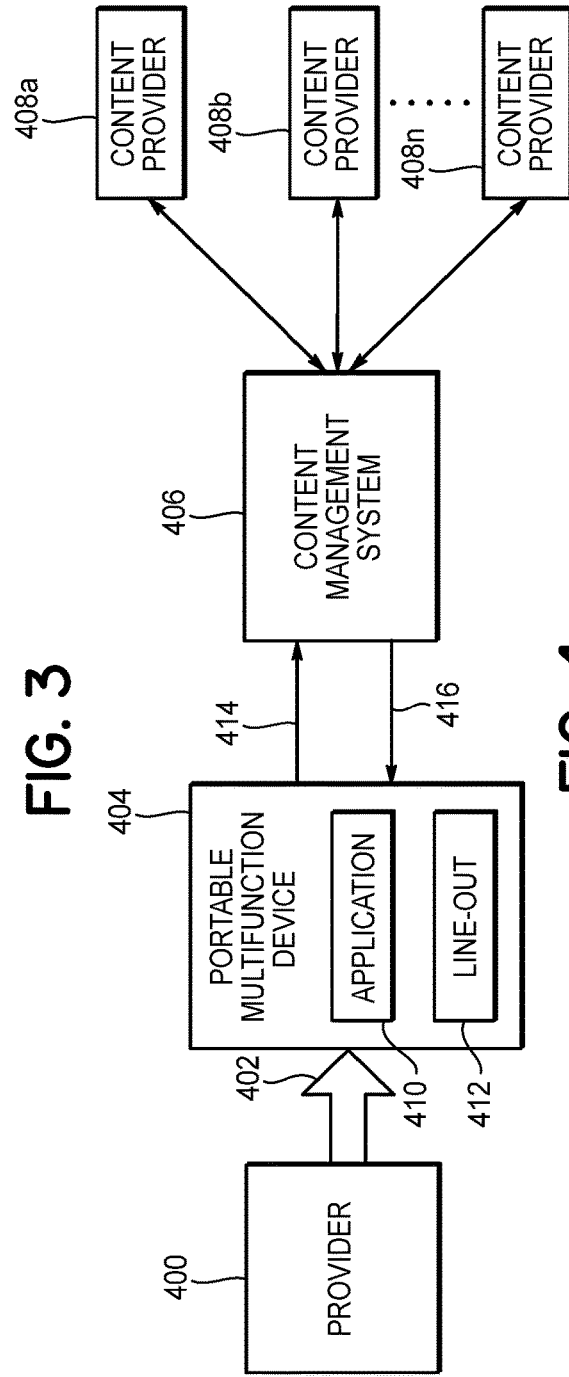

FIG. 4 illustrates an example computer-based content delivery system in accordance with one non-limiting embodiment. A provider 400 may transmit an inaudible signal 402. An application 410 running on the portable multifunction device 404 may routinely detect for inaudible signals, such as by polling signals received via the line-out jack 412. Upon detection of the inaudible signal 402, the application 410 may process the signal to extract information contained within the inaudible signal 402 (such as a coded identifier, for example). The portable multifunction device 404 may then transmit an upload packet 414 to the content management system 406. The upload packet 414 may include, for example, a coded identifier and other information that could be used to satisfy various triggers. The content management system 406 may then process the coded identifier and identify a content provider 408a-n that is affiliated with the coded identifier. The content management system 406 may sent a request to the content provider 408 and in return receive a piece of content. The content may subsequently be provided to the portable multifunction device 404 via a download packet 416.

Figure 5:
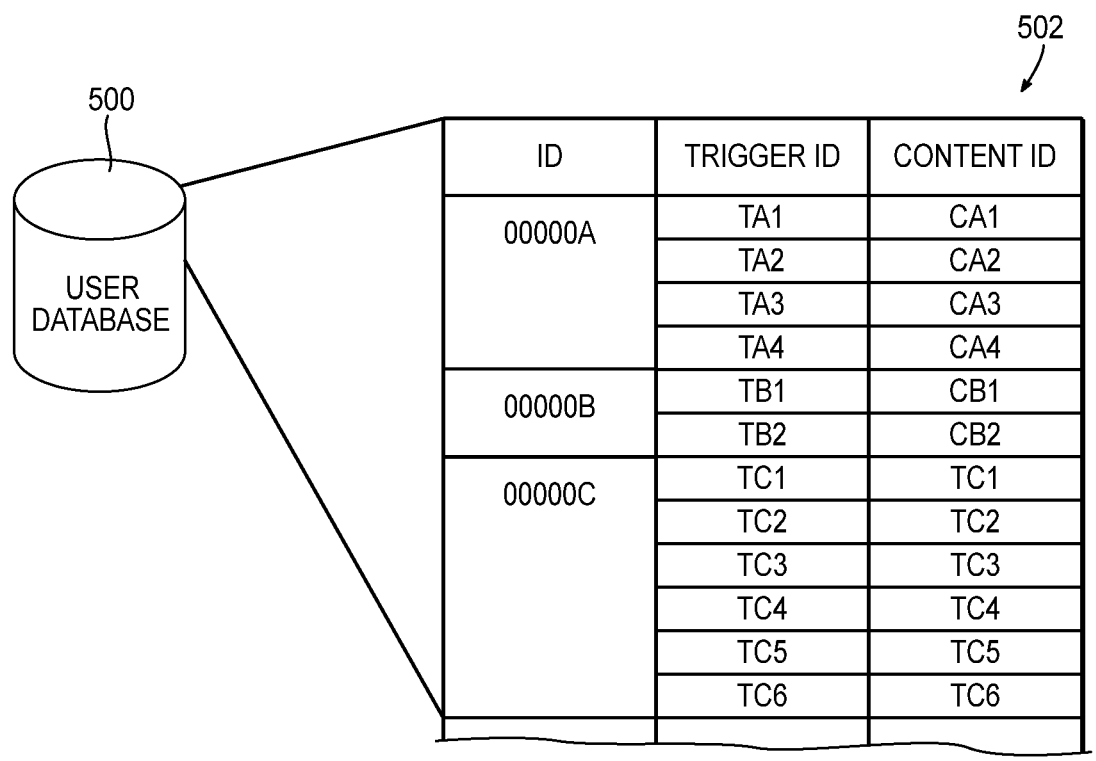
FIG. 5 is an example block diagram of a data store and content record for a content management system in accordance with one non-limiting embodiment.

FIG. 5 is an example block diagrams of a data store 500 and content record 502 for a content management system. The data store 500 may be similar to content database 220 (FIG. 2), for example. FIG. 5 illustrates just one possible content record 502 that could be utilized by the content management systems and methods described herein. Other records, type of records, and variations are possible as would be generally understood in the art. The content record 502 can be stored in an electronic data store 500, also called a database. Each content record 502 may include an ID column. The ID column may store, for example, coded identifiers (shown as 00000A-0000C). The content record 502 may also have a trigger ID column. The trigger ID column may associate various triggers with each coded identifier. The triggers may be for example, a geographical location, a total number of listens, and so forth. Another column may store a content ID which is associated with each trigger ID. The content ID may identify the file that is to be transmitted to a portable multifunction device when a particular coded identifier is received and a particular trigger is satisfied. In some embodiments, a content owner or content manager may have access to the form record 502. While FIG. 5 illustrates one embodiment of a content record 502, it is to be readily appreciated that the present disclosure is not limited to a particular content record, schema, or storage technique.

Figure 6:
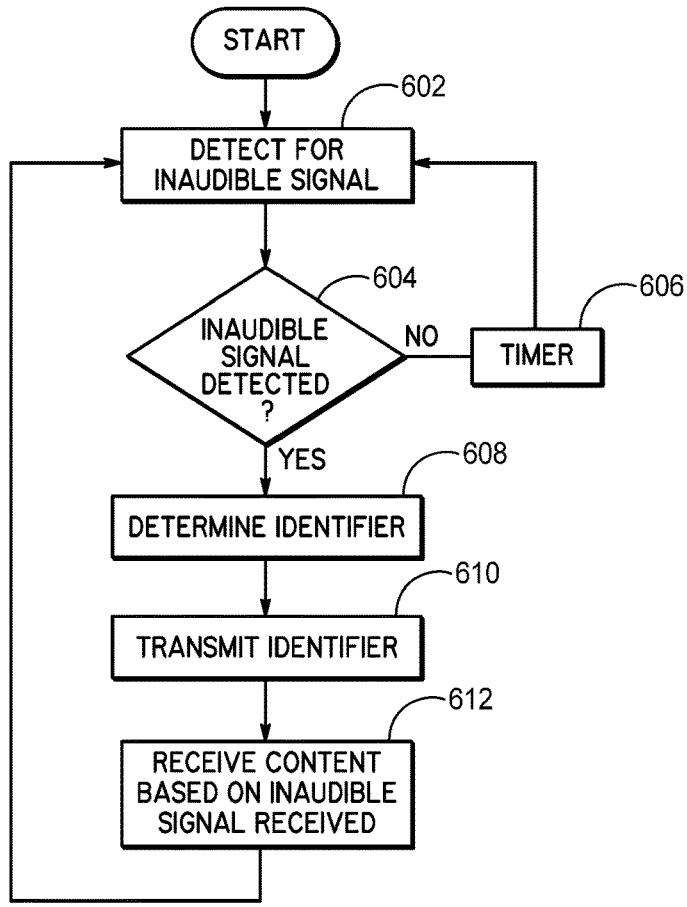
FIG. 6 is a flowchart of an example passive detection process for a user device in accordance with one non-limiting embodiment.

FIG. 6 is a flowchart of an example passive detection process for a user device, such as a portable multifunction device, in accordance with one non-limiting embodiment. At 602, the user device detects for an inaudible signal. As described above, the user device may passively poll various components, such as a microphone of the user device or a signal that is outputted via a headphone port, for example. If an inaudible signal is not detected, the process may wait for a timer to expire at 606 and repeat the process. If an inaudible signal is detected, at 608 the user device may process or analyze the inaudible signal to determine an identifier carried by the inaudible signal. The identifier may be in the form of a series of 0s and 1s or other form of identifier, for example. At 610, the user device may transmit the identifier to a content management system, such as content management system 200 (FIG. 2). At 612, content may be received by the user device from the content management system based on the inaudible signal originally received by the user device. The process may then resume detecting inaudible signals at 602. It is noted that the process illustrated in FIG. 6 may occur without input from a user. In other words, the process illustrated in FIG. 6 may be a largely passive process, implemented by an application running in the "background" of a user device.

Figure 7:
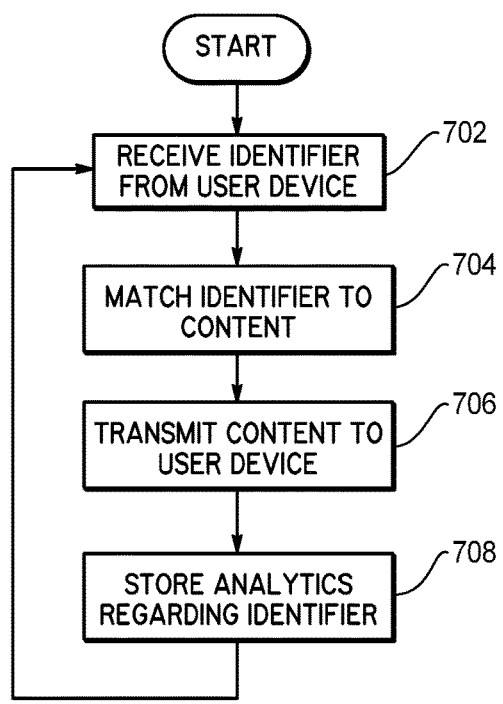
FIG. 7 is a flowchart of an example content delivery process for a content management system in accordance with one non-limiting embodiment.
Figure 8A:
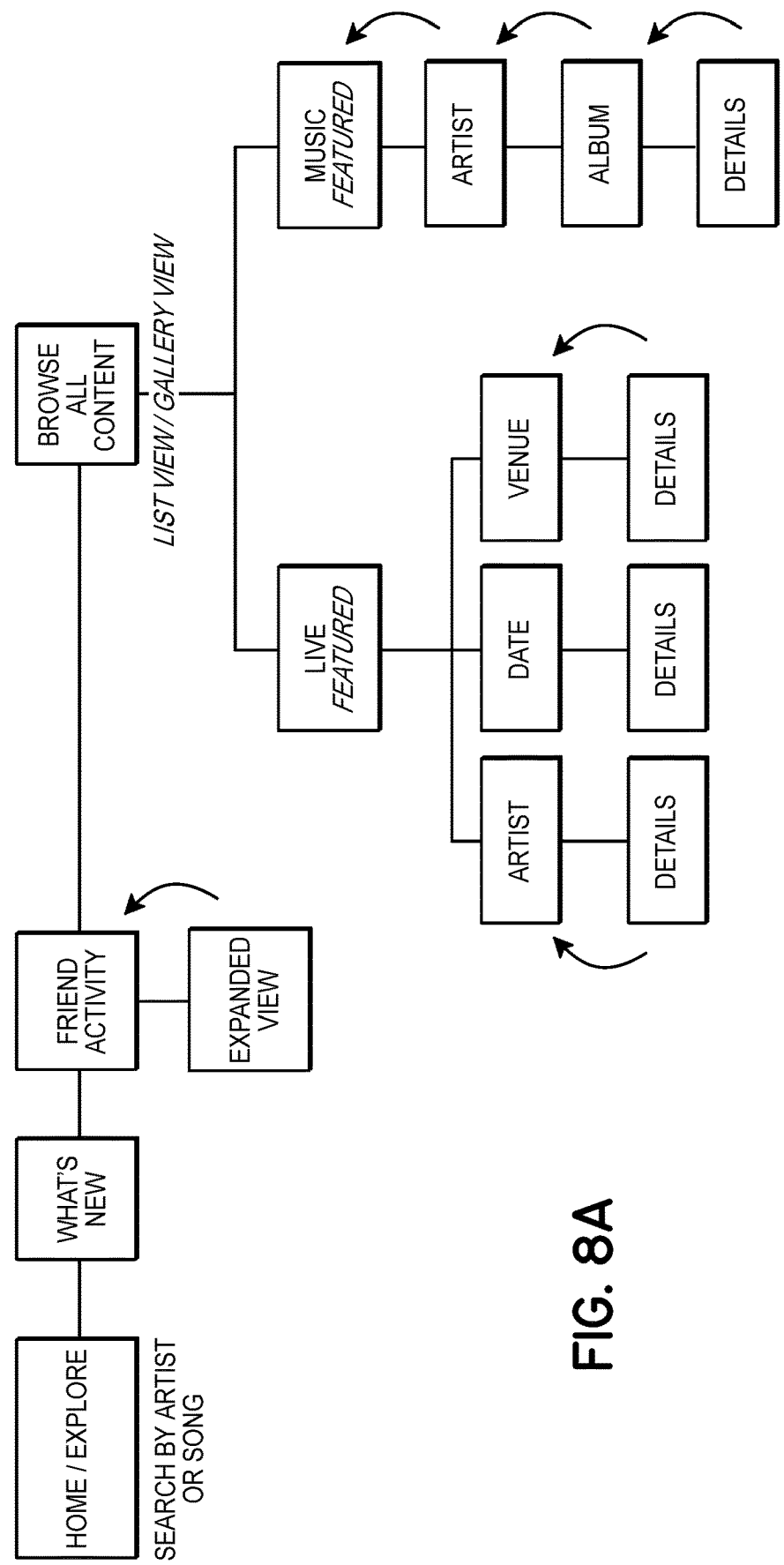
FIGS. 8A-8D illustrate an example user flow of a software application in accordance with a non-limiting embodiment.
Figure 8B:
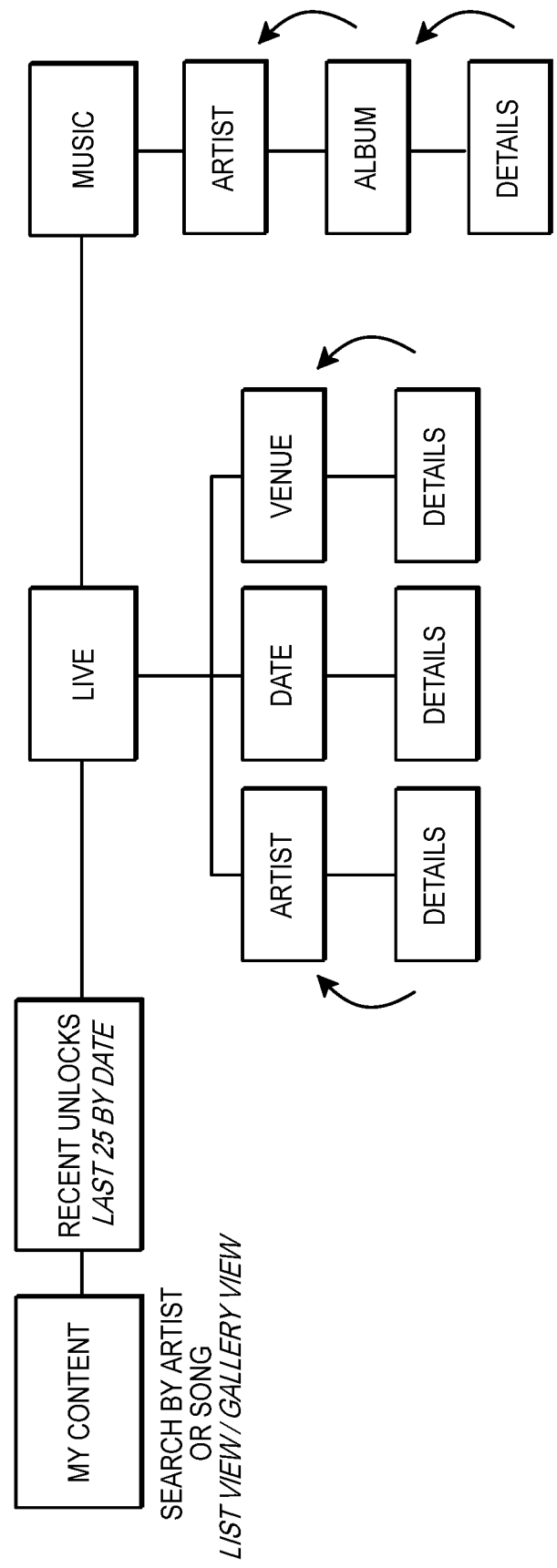
Figure 8C:
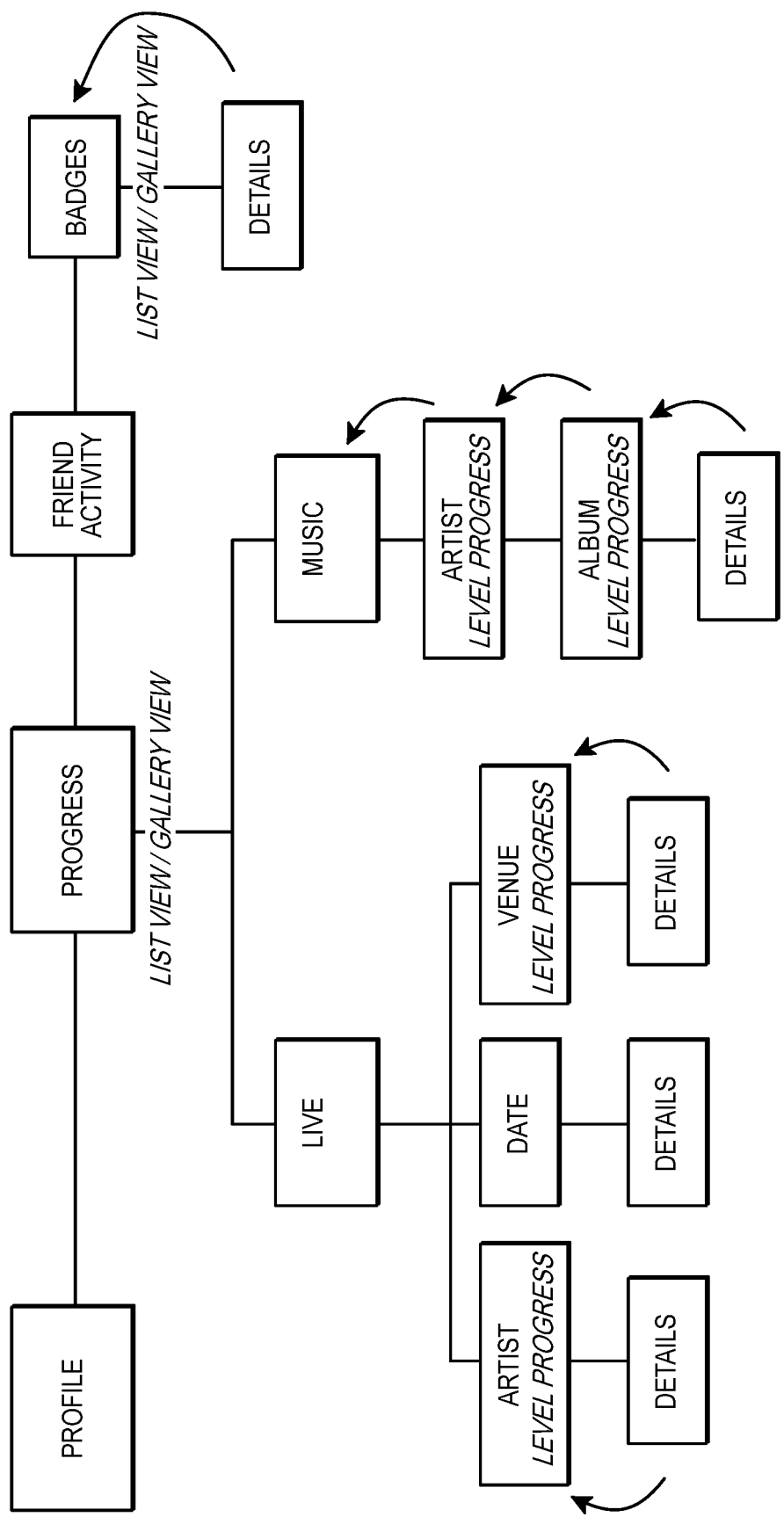
Figure 8D:
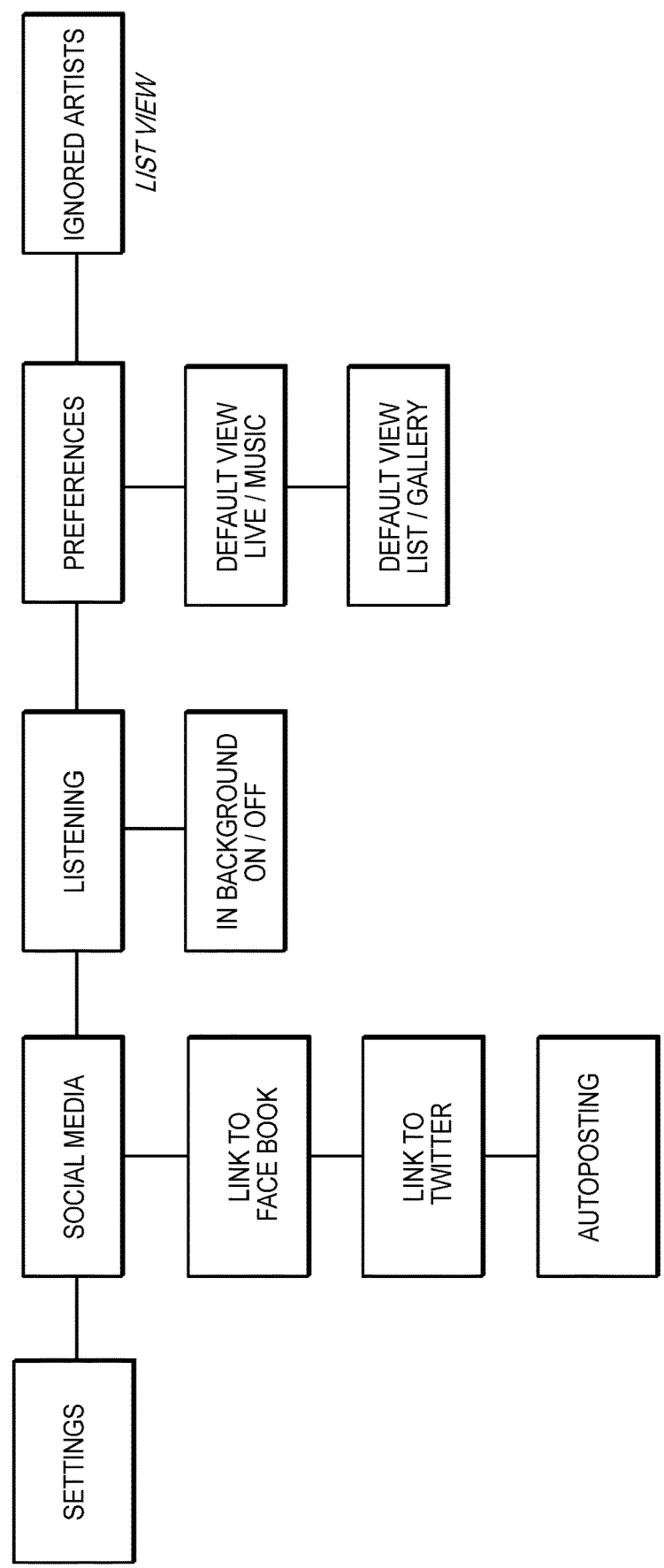

FIG. 7 is a flowchart of an example content delivery for a content management system in accordance with one non-limiting embodiment. At 702, an identifier is received from a user device. At 704, the identifier is matched with content. The content may be, for example, video content, audio content, or any other data that may be transmitted to a user device. At 706, the content may be transmitted by the content delivery system to the user device. At 708, analytics regarding the identifier may be stored. As is to be appreciated, a wide variety of data regarding the identifier may be stored. For example, geographic data, time/date data, user device data, and/or user data may be stored by the content management system.

As described herein, a software application may be executed on a portable multifunction device to allow a user to access and store content received from the content management system. The application may also allow a user to provide user preferences to the content management system. As is to be appreciated, the application may be structured in a number of ways. FIGS. 8A-8D illustrate an example and non-limiting user flow of a software application in accordance with systems and methods described herein.

Analytical information may be gathered from the use of the present invention by a portable multifunction device. Specifically, the location of a device and its co-location with other devices may be learned from inaudible signals broadcast at particular locations and from or two other devices. The reporting of beacons heard can thus lead to a record of movement and near-field interaction of portable multifunction devices, even without the delivery of responsive content. This can be used to provide incentives of the type described above for frequent visitors to a venue, persons in a particular location or ad-hoc assembly, and the like.

In the event of plural sources of inaudible signals in a given locality, the inaudible signals may be modulated in frequency or timing to avoid collisions and interference between the signals. Furthermore, inaudible signal transmitters may ad-hoc network and synchronize their transmissions to avoid collisions. Directional speakers may be used to further limit interference between fixed locations.

Inaudible signals may be coded in a manner optimized for the Fraunhofer codec popularly used for MP3 files: for example the inaudible signals may be encoded for efficient conversion to frequency domain by selecting frequencies efficiently coded by Fraunhofer compatible decoders.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed:

1. A method of content delivery and management, comprising:
    detecting a human-inaudible acoustic signal at a content delivery device,
    supplying an indication of receipt of the inaudible signal from the content delivery device to a content management system,
    responding to the indication of receipt of the inaudible signal by providing content to the content delivery device for presentation to a user of the content delivery device,
    wherein the content is provided to the content delivery device in conjunction with a trigger description indicating whether content can be presented on the device, and
    permitting access and presenting the content upon satisfaction of a threshold condition set forth in the trigger, wherein the threshold condition comprises one or more of a number of times the inaudible signal has been received, a number of times a song has been played, geographic location of the content delivery device, whether the content delivery device is moving, time of day, user preferences, attendance of the content delivery device at a music or entertainment venue, presence of the content delivery device at a commerce, shopping or business environment, or receipt of a second human-inaudible acoustic signal.

2. The method of claim 1 wherein the content delivery device is a portable multifunction device, and the indication of receipt is delivered wirelessly to the content management system.

3. The method of claim 1 wherein the content delivery device periodically queries acoustic signals received at the device to detect a human-inaudible acoustic signal.

4. The method of claim 1 wherein the content delivery device detects the human-inaudible acoustic signal by use of one or more of: an on-board microphone, an on-board speaker, an audio input, and an audio output.

5. The method of claim 1 wherein the human-inaudible acoustic signal is embedded in human-audible audio content comprising one or more of: speech, music and background sound.

6. The method of claim 1 wherein the human-inaudible acoustic signal is embedded in human-audible audio content being produced by the content delivery device.

7. The method of claim 1 wherein the human-inaudible acoustic signal is at a frequency outside a common range of human hearing.

8. The method of claim 7 wherein the human-inaudible acoustic signal is at a frequency at one or more of below 20 Hz and above 20 kHz.

9. The method of claim 1 wherein the human-inaudible acoustic signal is in the form of a modulated code of a series of logic 0 and 1 bits.

10. The method of claim 9 wherein the modulated code is repeatedly incorporated in the human-inaudible signal.

11. The method of claim 9 wherein the modulated code is transmitted to the content management system to indicate receipt of the inaudible signal.

12. The method of claim 11 wherein, in addition to the modulated code, the indication of receipt transmitted to the content management system comprises one or more of: time data, date data, accelerometer data, geographic data, demographic data, content delivery device data, and content delivery device owner data.

13. The method of claim 1 further comprising storing the content delivered from the content management system in the content delivery device for presentation to a user of the content delivery device at a selected time after receipt.

14. The method of claim 1 wherein the content provided to the content delivery device comprises one or more of: video, audio, images, and text.

15. The method of claim 1 wherein the content provided to the content delivery device comprises one or more of concert video or stills, artist photographs or videos, produced music videos, artist interviews, movies, commercials, or portions or combinations thereof.

16. The method of claim 1 wherein the content provided to the content delivery device comprises one or more of prerecorded music, ringtones, musical works in digital form, still pictures, artwork, logos, wallpapers, lyrics, quotations, coupons, passwords, pass codes, coupon codes, messages, email addresses, text message addresses, instant messages, advertisements, education content, or portions or combinations thereof.

17. The method of claim 1 wherein the content is delivered to an electronic mailbox associated with the content delivery device or with a user of the content delivery device.

18. The method of claim 1 wherein the human-inaudible acoustic signal is transmitted from a second portable multifunction device, the signal embedding peer-to-peer networking information for the transmitting device, comprising one or more of: a public IP address, a private IP address, a port number, a wireless network identification, and a local area network identification.

19. The method of claim 18 further comprising communicating between the portable multifunction devices one or more of:
- a key to unlock a door within the human-inaudible acoustic signal;
- payment or coupon information;
- entertainment content;
- contact information;
- data;
- data pointers;
- currency or value exchanges;
- mesh network originated content gathered by or transmitted to the devices.

* * * * *